R. W. MAGNA.
BATTERY HOLDER.
APPLICATION FILED FEB. 11, 1909.

946,905.

Patented Jan. 18, 1910.

2 SHEETS—SHEET 1.

WITNESSES:
A. C. Fairbanks.
J. M. Sterns

INVENTOR.
Russell W. Magna,
BY
Webster & Co.,
ATTORNEYS.

R. W. MAGNA.
BATTERY HOLDER.
APPLICATION FILED FEB. 11, 1909.
946,905.
Patented Jan. 18, 1910.
2 SHEETS—SHEET 2.
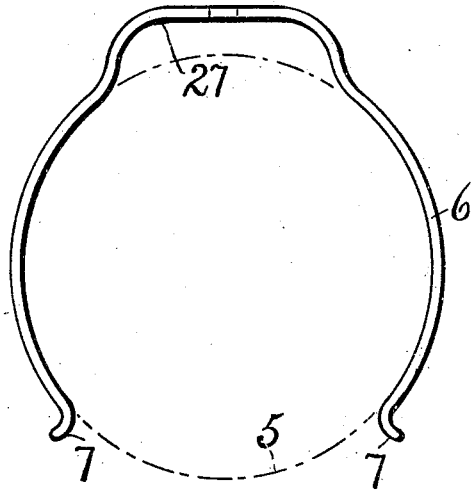
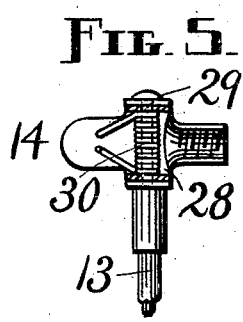
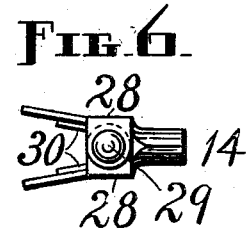
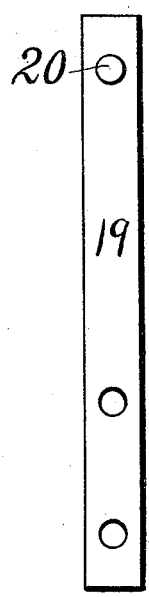
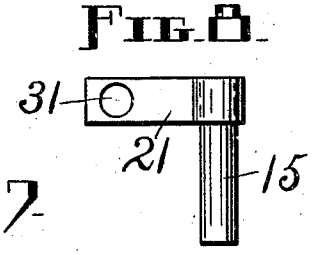
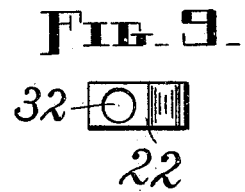
WITNESSES:
A. C. Fairbanks.
J. M. Sterns
INVENTOR.
Russell W. Magna,
BY
Webster & Co.,
ATTORNEYS.

UNITED STATES PATENT OFFICE.

RUSSELL W. MAGNA, OF HOLYOKE, MASSACHUSETTS.

BATTERY-HOLDER.

946,905.

Specification of Letters Patent.   Patented Jan. 18, 1910.

Application filed February 11, 1909.   Serial No. 477,334.

*To all whom it may concern:*

Be it known that I, RUSSELL W. MAGNA, a citizen of the United States of America, residing at Holyoke, in the county of Hampden and State of Massachusetts, have invented a new and useful Battery-Holder, of which the following is a specification.

My invention relates to improvements in devices for holding batteries in boxes or other receptacles and while removing them from and placing them in such boxes or receptacles, in which I employ a support which rises from a base-piece between the lateral edges of the latter and is equipped with suitable securing or gripping means and connecting means for the batteries held thereby, all as hereinafter set forth.

The objects of my invention are, first, to produce a simple, compact, and comparatively inexpensive holder with which a number of dry batteries can be easily and quickly connected or disconnected and when connected will be securely supported and held in place, such holder being designed especially to fit the ordinary battery box of an automobile; second, to provide such a holder with convenient means whereby the wires which constitute the circuit members to and from the holder and its batteries can be readily attached and detached to and from said holder, and, third, to furnish a holder of this kind which can be taken from the box, carried about freely, and returned to the box without fear of dropping or disarranging in any way the batteries supported thereby. This last is an important advantage, because it is necessary more or less frequently to change the old batteries of an automobile for new ones, and it is a great convenience to be thus able to lift them all out together from their box, take them into a garage, substitute new batteries for the old ones, and then carry the new batteries back and place them in said box.

I attain these objects by the means illustrated in the accompanying drawings, in which—

Figure 1:
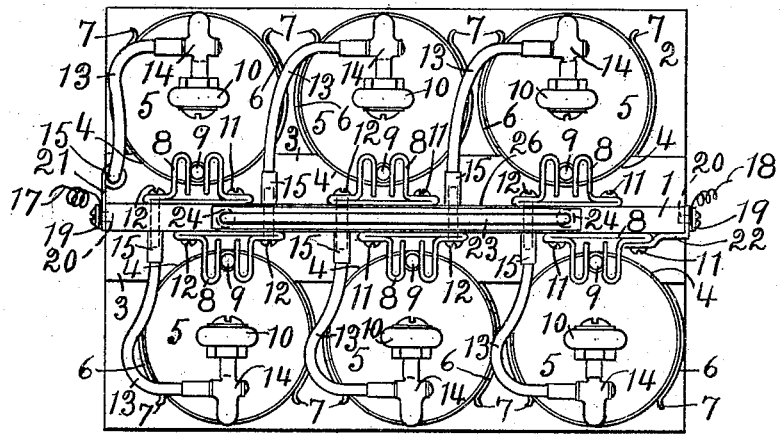
Figure 2:
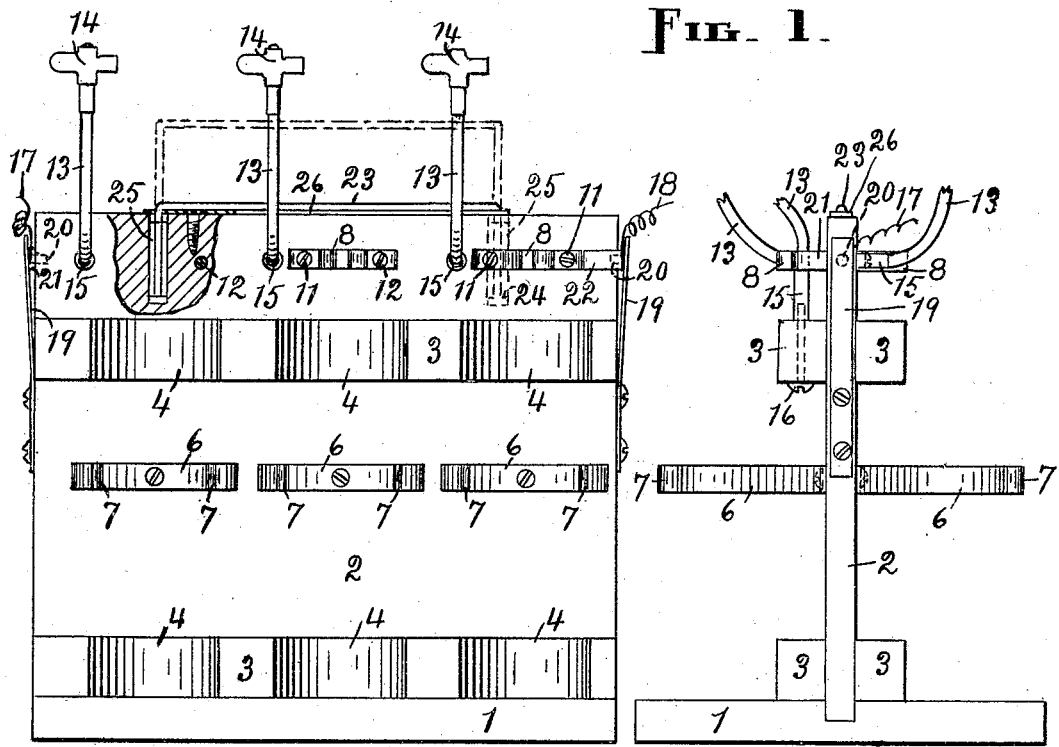
Figure 3:
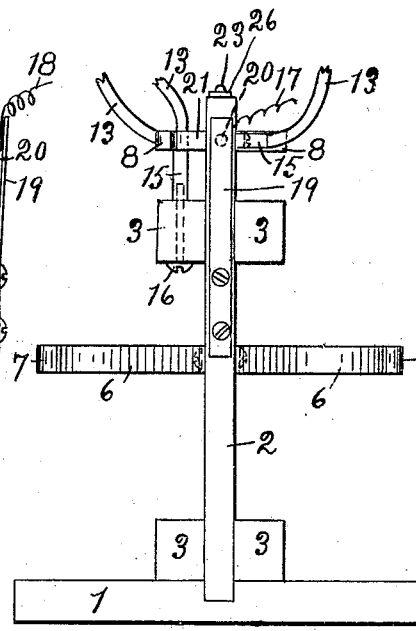

Figure 1 is a top plan view of a preferred form of my holder with its equipment of six batteries in position, the holder and batteries as shown either being ready to be placed in a box or else having been just taken therefrom, as the case may be; Fig. 2, a side elevation of said holder without the batteries, a portion of the vertical support together with a portion of the superimposed plate being broken away to show to better advantage how the handle is connected with these parts, and said handle being shown in its elevated position by dot-and-dash lines; Fig. 3, an end elevation of the holder, the outer terminals with their clips or snap-contacts of the flexible connections being broken off; Fig. 4, an enlarged plan of one of the clips; Fig. 5, an enlarged section of one of the snap-contacts; Fig. 6, an enlarged end elevation of such snap-contact; Fig. 7, an enlarged inside elevation of one of the connector springs; Fig. 8, an enlarged inside elevation of the circuit-forming member at one end, and, Fig. 9, an enlarged inside elevation of the circuit-forming member at the other end.

Similar figures of reference designate like parts throughout the several views.

My holder has the general form of an inverted T and is usually made of wood. It comprises a horizontal base 1 and a vertical support 2 rising from the longitudinal center of said base, with four horizontal supporters or stays 3, two of such stays being in the angles formed by said support with said base, and two on opposite sides of the support a little distance below the top of the same. In these stays are concavities or recesses 4 which conform to the shape of the batteries which the device is designed to receive, or to such portions of said batteries as are to be fitted into said recesses. There are three recesses 4 in each stay 3, since this holder is intended to accommodate six batteries, three on a side, although the holder might be made to accommodate more or less than that number. The batteries are indicated at 5, in Fig. 1. The recesses 4 in each vertically arranged pair on a side are in line with each other, but the vertical center of such recesses on one side is slightly to the right or left of the vertical center of the corresponding recesses on the other side for reasons which will presently appear. Suitable fastening means, for the batteries 5, must be provided, and such means should be of such a nature as to coöperate with the stays 3 in holding said batteries securely in place in the holder, and also to permit the batteries to be easily and quickly attached to and detached from said holder. For this purpose, I prefer to employ a plurality of curved, open-ended spring clips 6 which are fastened to both sides of the support 2 between the upper and under stays 3, said clips being in line with the recesses 4 above and below. There are six clips 6, and each has its inner or middle portion bent backward or outward, as shown at 27, in Fig. 4, and fastened to the support 2, and is provided with flaring lips 7—7 which enable a battery to be readily forced into the embrace of the clip. When the batteries 5 are in position, the arms of the clips 6 partially embrace the sides of said batteries and at the same time retain the batteries in the recesses 4, so that said batteries cannot get loose or rattle. The clips yield sufficiently, however, to permit the batteries to be forced into and out of engagement therewith.

In order to provide for expeditiously connecting the batteries 5 in series without liability of mistake, and for as expeditiously disconnecting said batteries, I equip the holder with a suitable fixed contact 8 for the negative pole 9 of a battery, and with some suitable flexible connection for the positive pole 10 of such battery.

Each fixed contact, in the present instance, consists of a strip of more or less resilient metal doubled on itself to form the screw-receiving ends of the contact, and having its free ends bent outward, over toward a common center, and then inward to form the pole- or binding-screw-receiving portions of the contact. This construction insures a good engagement between the contact 8 and the binding-post which constitutes the negative pole 9 of a battery 5, and allows such binding-post to be forced into engagement with said contact at the time the battery is forced into the corresponding clip 6, and to be forced out of such engagement at the time the battery is forced out of such clip. The contacts 8 are secured by screws 11 and 12 to the support 2 on opposite sides thereof and above the upper stays 3, those on one side of said support being in staggered relation to those on the other side so as to bring their vertical centers into line with the vertical centers of the recesses 4 and clips 6 below. By thus offsetting or staggering the contacts 8, I make provision for utilizing the screws 12 for a double purpose, as will subsequently be explained. Incidentally, the contacts 8 assist in steadying and supporting the batteries, when in place, by reason of the engagement of the poles 9 with said contacts.

For the flexible connection, hereinbefore referred to, I prefer to use a device which comprises a length of insulated wire 13 having a snap-contact 14 at one end and some suitable fastening means at the other end. This snap-contact may consist of two members 28, comprising nose-pieces at one end and spreading wing pieces at the other, mounted on a pivot pin 29, with a spring 30 also on said pin so arranged as to bear against said wings to force them apart and said nose-pieces into engagement. Upon pressing the wings of the members toward each other the nose-pieces separate or open. The snap-contact 14 is adapted for engagement with and disengagement from a binding-post of the carbon electrode or positive pole 10 of a battery, it can be manipulated with ease and despatch, and when connected with the binding-post the connection is a good one electrically. The fastening means, in this case, for each flexible contact, consists of a sleeve 15, and this sleeve, excepting in one instance as explained below, is secured in place, horizontally, with one end against one side of the support 2 by means of one of the screws 12, after said screw has passed through the adjacent end of an adjacent contact 8 and through said support, such contact being, of course, on the opposite side of the support to the sleeve. The sleeve 15 of the first flexible contact at the positive end of the holder, which is the left-hand end in the first two views and the end presented to the beholder in the last view, is mounted in a vertical position on one of the upper stays 3 and there held by means of a screw 16 which passes upward through said stay into threaded engagement with said sleeve.

I will next describe the connections for the holder at the ends of the same with the main wires of the circuit, attached terminal portions of such wires being represented at 17 and 18, although in practice when the holder is out of its box, as it is in the drawings, said holder is disconnected from such wires, as will be readily understood. A vertical spring 19, having a pin 20 on its inner face near the top, is fastened at its lower terminal to each vertical edge of the support 2. A circuit-forming strip 21 extends from the upstanding sleeve 15, to which it is secured, over between the adjacent edge of the support 2 and the head of the adjacent spring 19, such strip being perforated at 31, Fig. 8, as is the support to receive the pin 20 which projects inward from said spring. The wire 17 is firmly engaged between the strip 21 and the associated spring 19, said wire being looped to receive the pin 20 carried by said spring. At the opposite end of the support 2, a circuit-forming angle 22 serves a similar purpose to that of the strip 21. One end of the angle 22 is tightly secured to the nearest fixed contact 8 by means of the next adjacent screw 11, and the other end of said angle is bent over the adjacent edge of the support 2 inside of the head of the spring 19 at this end of said support. The short arm of the angle 22 and the support 2 behind it are perforated for the pin 20 which operates through and in such perforations, the perforation in said short arm appearing at 32, in Fig. 9. The wire 18 is looped and attached to the holder through the medium of the angle 22 and the associated spring 19 and pin 20, in substantially the same way that the wire 17 is attached to said holder, good electrical connections being insured in both cases. To disconnect the wires 17 and 18 from the holder it is simply necessary to force the outer ends or heads of the springs 19 outward far enough to free the looped ends of said wires from the pins 20; and said springs are drawn outward at the top in the same manner and to the same extent, of course, to allow such lapped ends to be introduced into place for the purpose of connecting the wires to said holder again. When the aforesaid looped ends of the wires 17 and 18 are in place, the springs 19 are released and their resiliency causes their heads and pins to move inward and forcibly engage such wires. It will now be seen that, when the batteries 5 have been placed in the holder and connected, as hereinbefore fully set forth, and when the holder has been connected with the wires 17 and 18, as also hereinbefore fully set forth, the electric circuit is complete from said wire 17 through said holder to said wire 18 by way of the strip 21, the flexible and fixed contacts with the interposed batteries having the snap-contacts 14 on their positive poles and their negative poles in the grasp of said fixed contacts, the screws 12 which connect five of the flexible-contact sleeves 15 with a corresponding number of contacts 8, and the angle 22. Upon disconnecting the wires 17 and 18 and taking the holder with its contained batteries to some suitable place for the exchange of said batteries, such exchange is effected by disengaging the snap contacts 14 and removing the batteries from the holder, and then placing fresh batteries in said holder and connecting them up in the same way as the old ones were connected. Now the holder with its load of new batteries is returned to its box or other receptacle and the wires 17 and 18 are once more attached thereto. It is plain that this exchange can be made very quickly and with very little trouble.

The holder is furnished with a handle 23 which is so attached to said holder that, when not in use, it descends out of the way. The handle 23 consists of a rod or wire bent to form two vertical branches which extend downward from the horizontal part or grip of the handle and have buttons 24—24 at their bottom ends. Vertical passages 25—25 are made in the top of the support 2 to receive the vertical branches and their buttons 24 of the handle 23. A plate 26 is fastened on top of the support 2 over the passages 25, and this plate has holes therein for the vertical branches of the handle, but such holes are not large enough for the buttons 24 to pass through. Normally the grip of the handle lies on top of the plate 26 with the buttons 24 at the bottom of the passages 25, but when it is desired to use the handle, in carrying the holder, said handle is drawn up until said buttons bear against the under side of said plate, as illustrated by dot-and-dash lines, in Fig. 2. When the handle is in the position last described, the holder can be moved about without difficulty. Upon its release, the handle descends by its own weight into its low position. The construction and arrangement of the handle and its retaining members, as shown and described, are particularly useful in adapting the holder to a closely fitting receptacle, provided with a cover, for the holder.

It is obvious that changes in the shape, size, and minor details of construction of my holder may be made without departing from the nature of my invention.

What I claim as my invention, and desire to secure by Letters Patent, is—

1. The combination, in a battery holder, with a vertical support and a base projecting laterally beyond such support in both directions, said support being provided with holding means and with circuit-forming means for batteries independent of said holding means, of circuit-forming members and springs having pins extending inward from their free terminals to engage said circuit-forming members and retain main circuit-forming wires in place between said last-mentioned members and springs, the circuit-forming members and springs which constitute engaging and disengaging means for the main circuit-forming wires being situated at the ends of said support and in circuit with said first-mentioned circuit-forming means.

2. The combination, in a battery holder, with a vertical support and a base projecting laterally from such support in both directions, said support being provided on both sides with retaining or holding means for batteries, of fixed and movable contacts on both sides of the support for the poles of said batteries, flexible connections between the support and said movable contacts, main-wire connecting means for the fixed contacts at one end and the flexible connection at the other end of the holder, and connecting means between the other flexible connections and the other fixed contacts, such last-mentioned means passing from one side of the support to the opposite side thereof.

3. The combination, in a battery holder, with a vertical support and a base projecting laterally beyond such support in both directions, of recessed blocks and spring clips which constitute retaining or holding means for batteries on both sides of said support, fixed contacts and flexible connections provided with movable contacts for the poles of said batteries also on both sides of said support, and engaging and disengaging means for main circuit-forming wires at the ends of the support, such engaging and disengaging means at one end being connected with one of the flexible connections and such engaging and disengaging means at the other end being connected with one of the fixed contacts, and the other flexible connections being connected through the support with the other fixed contacts.

RUSSELL W. MAGNA.

Witnesses:
F. A. CUTTER,
A. C. FAIRBANKS.